O. A. ECKRE.
RESILIENT WHEEL
APPLICATION FILED MAY 19, 1913.
1,110,427. Patented Sept. 15, 1914.
2 SHEETS—SHEET 1.
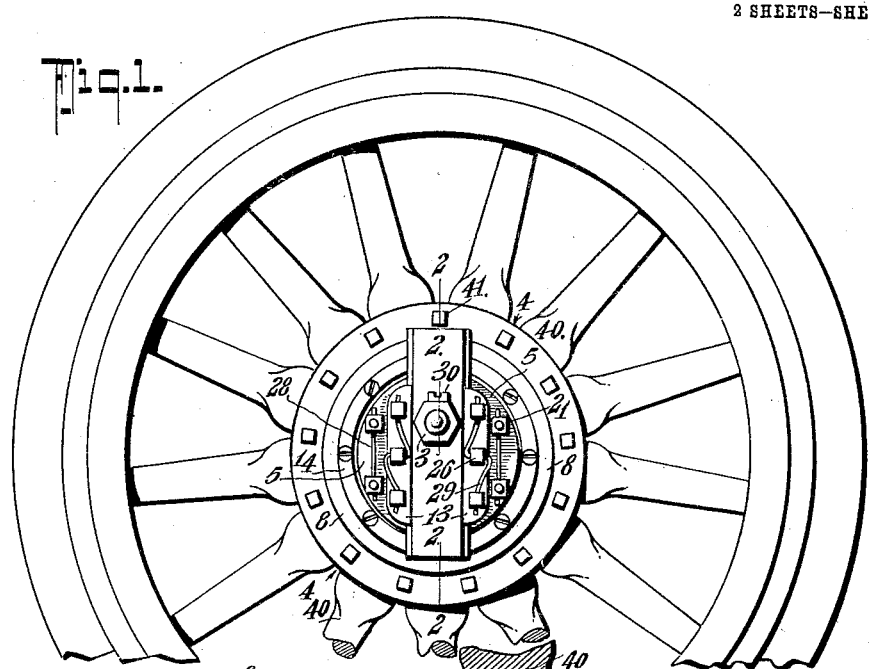
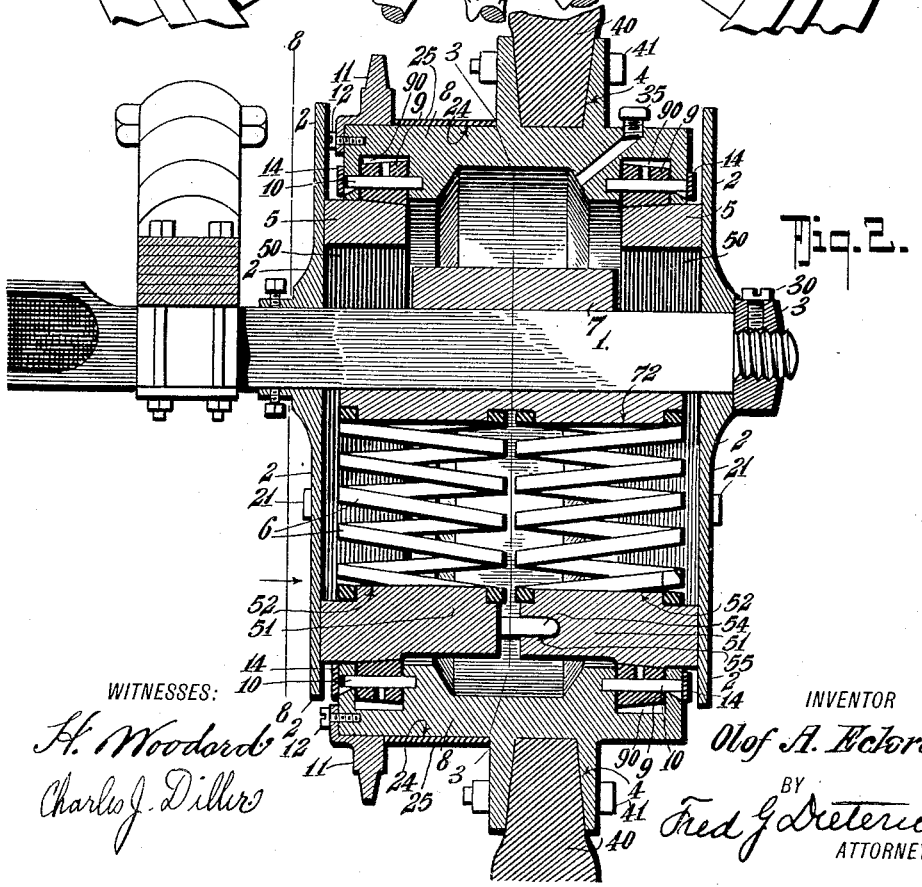
WITNESSES:
H. Woodard
Charles J. Diller
INVENTOR
Olof A. Eckre,
BY
Fred G. Dieterich
ATTORNEYS

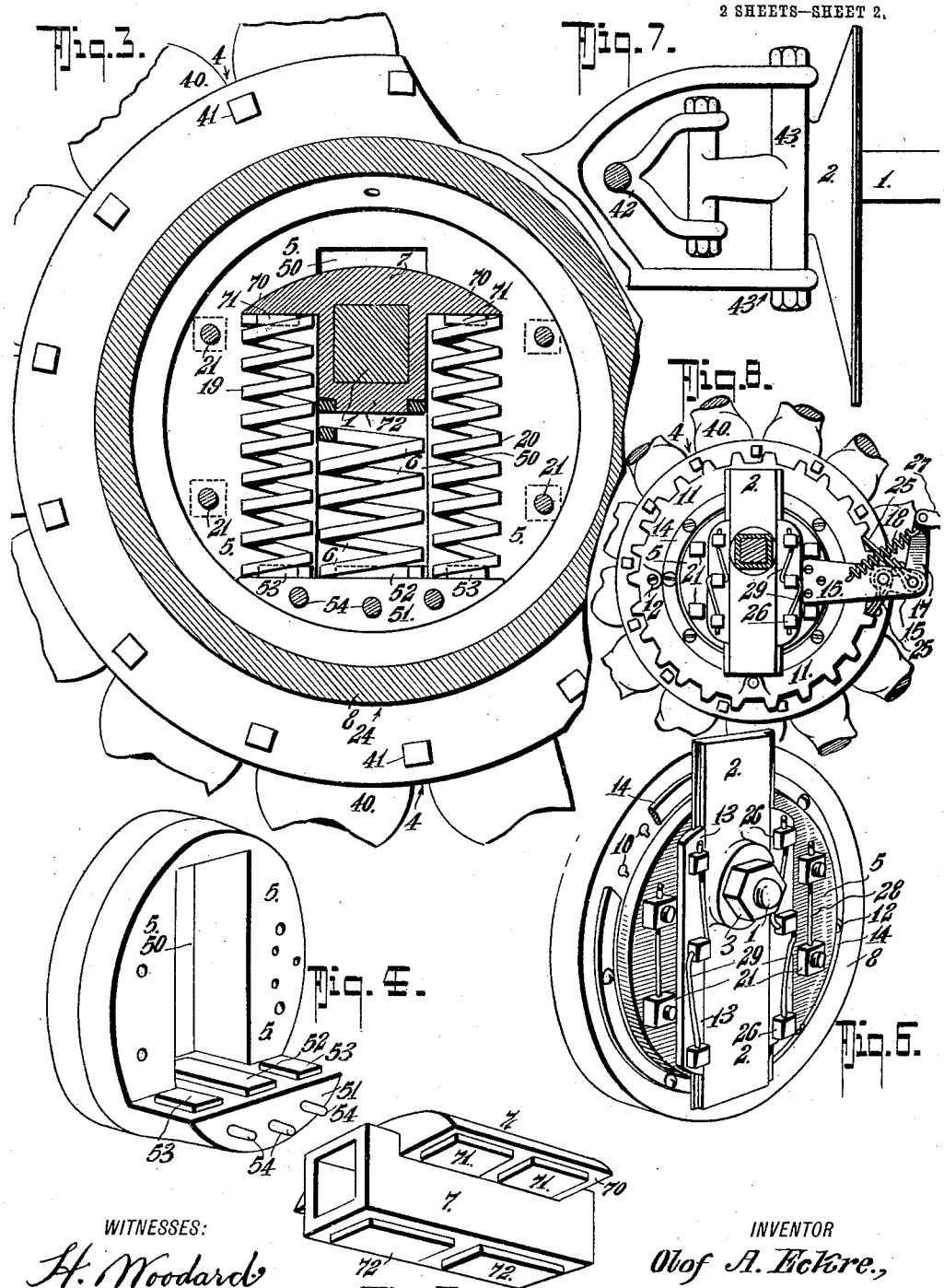

UNITED STATES PATENT OFFICE.

OLOF A. ECKRE, OF MINNEAPOLIS, MINNESOTA.

RESILIENT WHEEL.

1,110,427.  Specification of Letters Patent.  Patented Sept. 15, 1914.

Application filed May 19, 1913. Serial No. 768,563.

*To all whom it may concern:*

Be it known that I, OLOF A. ECKRE, residing at Minneapolis, in the county of Hennepin and State of Minnesota, have invented certain new and useful Improvements in Spring Hubs and Axles, of which the following is a specification.

This invention, which in its general nature relates to wheels, more specifically has reference to improvements in spring mounted skeins or spindles for axles.

With other objects in view, that will hereinafter appear, my invention consists of the peculiar combination and novel arrangement of the parts hereinafter specifically pointed out in the appended claims and illustrated in the accompanying drawings, in which:

Figure 1 is a front view of a portion of a vehicle wheel with my improved improvements applied. Fig. 2 is a vertical longitudinal section thereof taken on the line 2—2 on Fig. 1, and drawn on an enlarged scale. Fig. 3 is a cross section of the hub portion taken on the line 3—3 on Fig. 2. Fig. 4 is a detail perspective view of one of the slotted end members having the annular cone surfaces and the bottom or rest flange for the bumper springs. Fig. 5 is a perspective view of the sleeve that slidably fits on the axle and has the bearings and guides for the upper ends of the bumper springs. Fig. 6 is a perspective view of one end of the hub, and particularly illustrates the corelation of the slide plate carried on the axle end and the flanged guide devices therefor. Fig. 7 is a detail view of parts hereinafter explained. Fig. 8 is a detail section on the line 8—8 of Fig. 2.

In the practical application of my invention, I use an axle 1, preferably square in cross section, which runs entirely through the spring hub and is supported on the cushion or bumper springs contained within the hub, and arranged in the manner presently described.

2—2 designate an inner and an outer elongated steel end plate, the outer one of which fits onto the outer threaded end of the axle, and is held from working off the axle by the jam nut 3 and the lock pin 30. The inner plate 2 is fixedly held on the axle to turn therewith as clearly shown in Fig. 2. The plates 2—2 serve to keep the hub on the axle and also to keep the dust and dirt from working into the interior of the hub, their opposite edges being beveled as shown to provide for a close and accurate fitting in the guides 13 provided therefor, as is best shown in Figs. 1 and 6.

8 designates the hub body which is in the nature of an annular rim having a centrally disposed peripheral groove 4 for receiving the wheel spokes 40, whose hub ends are clamped in the said groove by the cross bolts 41, as shown.

5—5 designate a pair of disk-like end members, each of which has an elongated slot 50 through which the axle passes and each, at the base of the slot 50, has an inwardly and laterally extended flange 51 the upper face of which has a central elongated rib 52 that extends transversely off and nearly the full length of the said flange and a pair of shorter ribs 53, one at each side of the rib 52, the purpose of which will presently appear. The flange 51 of one of the members 5 has dowels 54 for engaging sockets 55 in the flange 51 of the opposing member 5 to thereby lock the two members 5—5 together. The periphery of each member 5 has a conical tread surface for receiving the conical roller bearings 9 mounted in annular grooves 90 on the internal face of the hub rim 8.

7 designates a sleeve-like hanger that is endwise slidable onto the axle and is of such a length that it snugly fits between the slotted end members 5 when the several parts are assembled as best shown in Fig. 2. Sleeve 7, the detailed construction of which is shown in Fig. 5, includes lateral flanges 70—70 having a pair of rectangular pendent ribs 71 and the sleeve portion proper having a pair of elongated ribs 72—72 on the under face, the latter ribs 72 forming mates for central ribs 52 on the flanges 51 of the slotted members 5; the ribs 71 forming mates for the ribs 53 on the said members 5. By reason of forming the sleeve-like member 7, and the members 5 with the ribs arranged as aforesaid, ample provision is made for mounting the buffer springs that take up the load on the axle. I prefer to use six buffer springs, two central ones 6, the upper and lower ends of which engage the upper ribs 72 and the lower ribs 52, and two sets of coiled springs 19 and 20, one pair at each side of the central springs 6, the said side springs being held in place by reason of their opposite ends seating over the upper ribs 71 and the lower ribs 53.

11 designates a sprocket rim that is removably mounted but fixedly held on the hub rim by screw bolts 12 (see Fig. 2).

14 designate band rings screwed to the hub rim over the openings through which the cone bearing roller pins 10 are inserted.

24 designates the brake band receiving surface of the hub rim, over which the band 25 is mounted, the latter being applied in any well known manner, for example, as indicated by Fig. 8, which shows a bracket 15 screwed to one of the slotted end members 5 and extended laterally to form a bearing for the bell crank lever 17 to which the ends of the band 25 are secured as shown.

18 designates a pull-back spring for holding the brake band normally loose and 27 the pull arm that actuates the arm 17.

21 designate cross bolts that hold the two end members 5 together and 28 designate wire locks that pass through the heads of the several bolts 21 to hold them from turning loose, similar wire locks 29 being used in the heads of the bolts 26 that lock the guides 13 to the slotted members 5.

35 designates a lubricating orifice in the hub rim.

In applying my spring hubs to motor driven vehicle wheels the hub construction for the front and rear wheels is the same, with the exception that the front wheel end plates 1 are connected to the stringing knuckle 41 that connect with the steering rods 42 as is diagrammatically indicated in Fig. 7.

From the foregoing description taken in connection with the drawings the complete construction, the manner in which the several parts coöperate, and the advantages of my invention will be readily apparent to those skilled in the art to which it relates.

It should be stated that the several parts can be quickly assembled since two end members 5 together with the sleeve 7, and the several springs can be bodily slipped over the axle before the outer plate 5 and its guide flanges are attached to the axle and to the outer member 5 and shoved endwise into the hub ring, it being understood that all shocks incident in driving the wheel are absorbed by the springs, as they, together with the end members 5 are held stationary while the hub ring turns on the said end members 5, the axle with the end plates 1 riding freely up and down in the slots of the end members, under the compression and expansion conditions of the buffer springs.

What I claim is:

1. In a hub and axle construction, the combination with the axle, of vertically elongated guide plates rigidly secured to the axle and spaced apart, a pair of bearing disks having vertically elongated slots and mounted on the axle in contact, one with each of said guide plates, said plates and the respective disks having tongue and groove connections a hub having bearing surfaces coöperating with said disks and rotatable thereon, and buffer springs located between the axle and said disks and continuously tending to move said disks downwardly with respect to the axle.

2. An axle, a pair of guide plates rigidly secured to the axle and spaced apart, bearing disks having a tongue and groove connection with said guide plates and provided with longitudinal slots to receive said axle, said bearing disks having peripheral bearing surfaces, and a hub mounted between said guide plates and having bearing surfaces coöperating with said bearing disks, said bearing disks having inwardly projecting flanges connected together, a flanged sleeve mounted on the axle, and buffer springs located between said flanges and said flanged sleeve.

3. An axle, a pair of guide plates rigidly secured to the axle and spaced apart, bearing disks having a tongue and groove connection with said guide plates and provided with longitudinal slots to receive said axle, said bearing disks having peripheral bearing surfaces, and a hub mounted between said guide plates and having bearing surfaces coöperating with said peripheral bearing surfaces, said bearing disks having inwardly projecting flanges connected together, a flanged sleeve mounted on the axle, and buffer springs located between said flanges and said flanged sleeve, said guide plates forming closures for the outsides of the elongated slots of said bearing disks whereby the space between said guide plates within said hub may be kept filled with a suitable lubricant.

OLOF A. ECKRE.

Witnesses:
M. INGEBRIGTSEN,
ANDREW FAWCETT.